United States Patent
Lee et al.

(10) Patent No.: US 9,306,470 B2
(45) Date of Patent: Apr. 5, 2016

(54) INVERTER CONTROL MODULE WITH HARMONIC SUPPRESSION CAPABILITY

(71) Applicant: Shun-Fu Technology Corp., Taipei (TW)

(72) Inventors: Shun-Hua Lee, Taipei (TW); Yung-Sheng Huang, Taipei (TW)

(73) Assignee: SHUN-FU TECHNOLOGY CORP., Taipei (TW)

( * ) Notice: Subject to any disclaimer, the term of this patent is extended or adjusted under 35 U.S.C. 154(b) by 124 days.

(21) Appl. No.: 13/958,946

(22) Filed: Aug. 5, 2013

(65) Prior Publication Data
US 2014/0218984 A1    Aug. 7, 2014

(30) Foreign Application Priority Data
Feb. 7, 2013    (TW) .............................. 102104740 A

(51) Int. Cl.
H02M 1/12    (2006.01)
H02M 7/44    (2006.01)
H02M 7/48    (2007.01)

(52) U.S. Cl.
CPC ....... *H02M 7/44* (2013.01); *H02M 1/12* (2013.01); *H02M 7/48* (2013.01)

(58) Field of Classification Search
CPC ..... H02M 7/515; H02M 7/517; H02M 7/519; H02M 7/521; H02M 7/537; H02M 7/493; H02M 7/2826; H02M 7/2807
USPC ...................................... 363/55, 56.01–56.12
See application file for complete search history.

(56) References Cited

U.S. PATENT DOCUMENTS

| | | | | | |
|---|---|---|---|---|---|
| 4,030,015 | A | * | 6/1977 | Herko et al. ..................... | 363/16 |
| 4,322,787 | A | * | 3/1982 | Kraus ............................ | 323/222 |
| 4,667,283 | A | * | 5/1987 | Seki et al. ....................... | 363/95 |
| 4,719,558 | A | * | 1/1988 | Hanada ............ | H02M 7/53871 363/132 |
| 5,355,025 | A | * | 10/1994 | Moran et al. .................. | 307/105 |
| 2007/0096680 | A1 | * | 5/2007 | Schroeder et al. ............ | 318/723 |

OTHER PUBLICATIONS

Johnston, R.H.; Boothroyd, A.R., "High-frequency transistor frequency multipliers and power amplifiers," Solid-State Circuits, IEEE Journal of, vol. 7, No. 1, pp. 81,89, Feb. 1972.*

* cited by examiner

*Primary Examiner* — Harry Behm
*Assistant Examiner* — Peter Novak
(74) *Attorney, Agent, or Firm* — Guice Patents PLLC

(57) ABSTRACT

An inverter control module electrically connected to an inverter module is disclosed to include an error detection unit for receiving a control signal and a feedback signal from an external source and processing these signals and then outputting a corresponding error signal, a signal amplifier module electrically coupled to the error detection unit for receiving the error signal and amplifying the error signal or raising the frequency of the error signal and then outputting the processed signal, and a driver module electrically coupled to the signal amplifier module for receiving the amplified or frequency-raised error signal and generating a corresponding driving signal and then outputting the driving signal to a power module of the inverter module for driving the power module to work.

6 Claims, 4 Drawing Sheets

INVERTER CONTROL MODULE WITH HARMONIC SUPPRESSION CAPABILITY

BACKGROUND OF THE INVENTION

1. Field of the Invention

The present invention relates to inverter control technology, and more particularly to an inverter control module that is capable of suppressing harmonics.

2. Description of the Related Art

An inverter generally comprises a control unit, a power module, and a wave filter, as shown in FIG. 1. Converters are now widely used in home electric appliances and industrial machines. However, subject to limitations of theoretical architecture, the practical application of an inverter will be accompanied by a large number of harmonic sources, generating serious pollution to power network systems.

The control of a conventional inverter, as shown in FIG. 2, is performed as outlined hereinafter. A control signal and a feedback signal from an external source are inputted into an error detection unit, causing the error detection unit to output a corresponding error signal to a pulse-width modulation unit, which then causes an output a corresponding current control signal to a delay processing and driving circuit, which is then driven to output a drive control circuit to a power module of the inverter, driving the power module to work.

Pulse width modulation technology for application to an inverter includes hysteresis comparator current control method, triangle wave current control method, horizontal phase wave carrier pulse width modulation method, predictive current control method, space vector modulation method, etc. Every one of the aforesaid various methods has its advantages and disadvantages. For example, the hardware circuit of the hysteresis comparator current control method is quite simple, however its switching frequency is not constant and difficult to control. Further, it contains a high percentage of harmonic components. The triangle wave current control method has the advantage of ease of frequency control, however, this method has a low response speed and can cause phase shift problems. The predictive current control method has the advantages of constant switching frequency and rapid response speed, however, this method requires precision circuit parameters and complicated computing process. Further, this method is a first-order approximation differential. In general, the aforesaid various pulse-width modulation techniques have their advantages and disadvantages, however, the major common drawbacks of the aforesaid various pulse-width modulation techniques is the current signal contains a big amount of harmonic components, as shown in FIG. 3. This problem must be overcome.

Subsequent prior art techniques adapted to overcome the aforesaid problems commonly use a RLC (resistor, inductor and capacitor) combination circuit consisting of multiple passive components to constitute a filter, such as band-pass filter or low-pass filter. However, these techniques still cannot effectively improve harmonic wave problems. In actual application, these techniques can lead to occurrence of series and parallel resonance problems.

SUMMARY OF THE INVENTION

The present invention has been accomplished under the circumstances in view. It is main object of the present invention to provide an inverter control module with harmonic suppression capability, which uses an error signal generated by an electronic circuit or process flow of an error detection unit to increase the switching frequency of a power module of an inverter module, thereby effectively suppressing any harmonic signal generated by the inverter module.

To achieve this and other objects of the present invention, an inverter control module of the invention is electrically connected to an inverter module. The inverter control module comprises an error detection unit adapted to receive and process a control signal and a feedback signal from an external source and then to output a corresponding error signal, a signal amplifier module electrically connected to the error detection unit and adapted to receive the error signal from the error detection unit and to amplify the error signal at a predetermined amplification ratio or to raise the frequency of the error signal for output, and a driver module electrically connected to the signal amplifier module and adapted to receive the amplified or frequency-raised error signal from the signal amplifier module and to generate a corresponding driving signal and then to output the driving signal to the power module of the connected inverter module for driving the power module to work.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
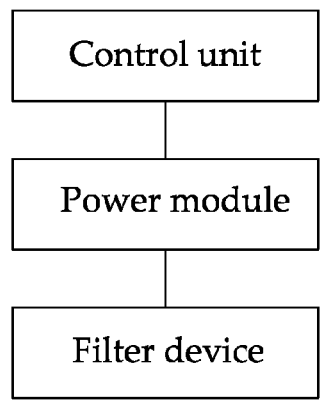
FIG. 1 is a block diagram of an inverter according to the prior art.
Figure 2:
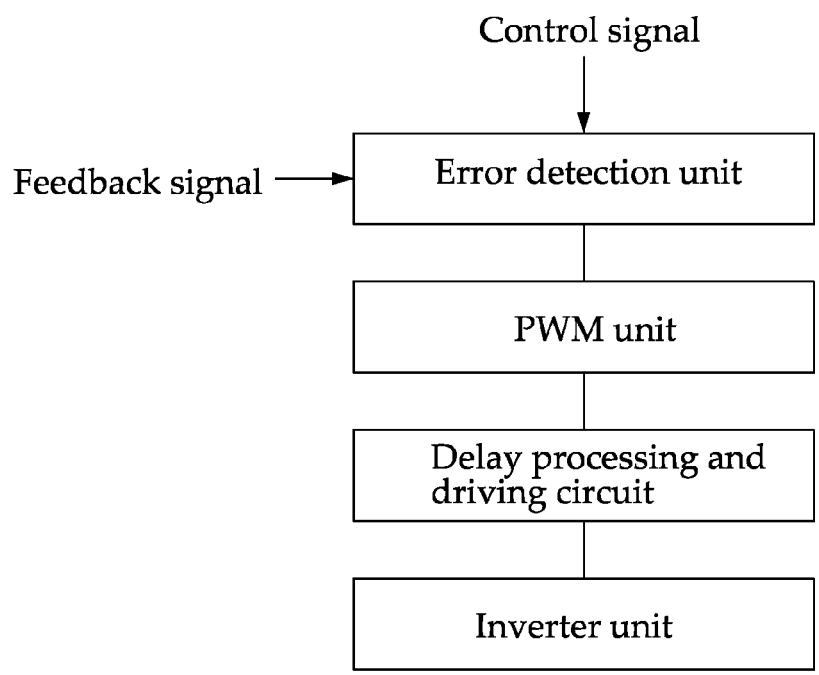
FIG. 2 is a block diagram illustrating the current control of an inverter according to the prior art.
Figure 3:
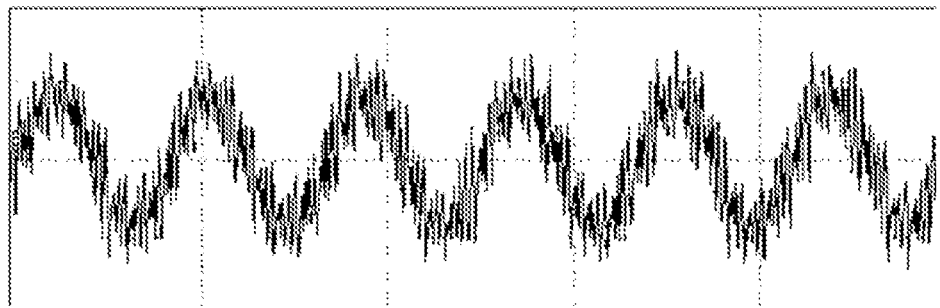
FIG. 3 is a schematic signal analysis diagram obtained from the prior art inverter current control module.
Figure 4:
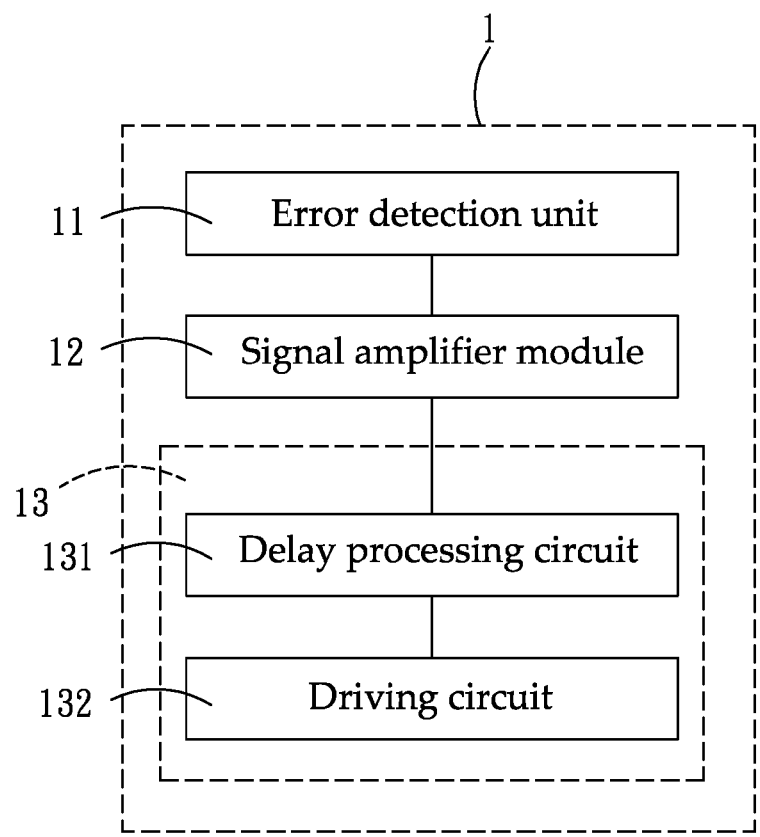
FIG. 4 is a block diagram of an inverter control module in accordance with the present invention.
Figure 5:
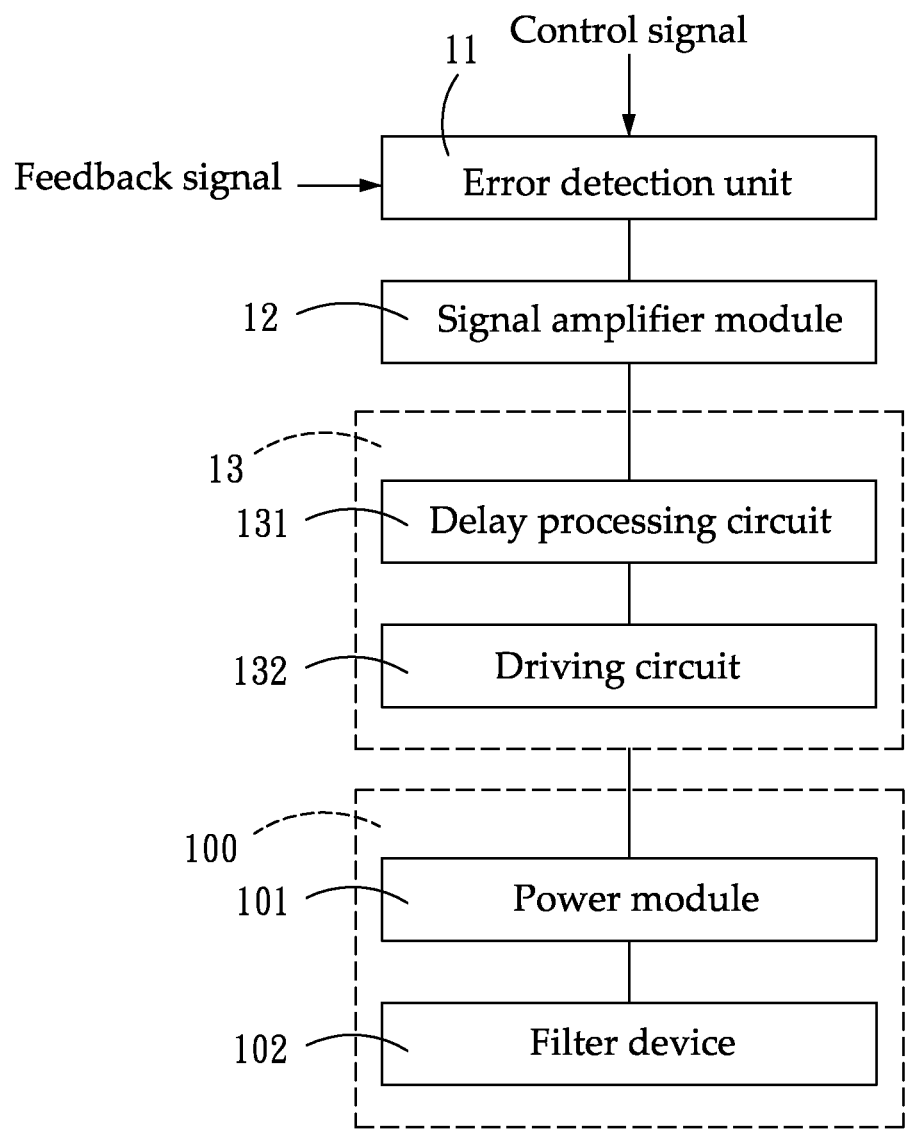
FIG. 5 is a block diagram of an application example of the inverter control module in accordance with the present invention.

Referring to FIG. 4, a block diagram of an inverter control module 1 in accordance with the present invention is shown. The inverter control module 1 is electrically connected to an inverter module 100, as shown in FIG. 5. The inverter control module 1 comprises an error detection unit 11, a signal amplifier module 12, and a driver module 13. The error detection unit 11 is adapted to receive and process a control signal and a feedback signal from an external source, and then to output a corresponding error signal. The signal amplifier module 12 is electrically connected to the error detection unit 11, and adapted to receive the error signal outputted by the error detection unit 11 and to amplify the error signal at a predetermined amplification ratio. In this embodiment, an amultiplier, adder, exponential amplifier, or any other hardware device or electronic circuit with signal amplification capability, or any device equipped with a mathematical equation, process flow or any other software for signal amplification can be used for the signal amplifier module 12. The driver module 13 is electrically connected to the signal amplifier module 12, and adapted to receive the amplified error signal from the signal amplifier module 12. Further, the driver module 13 comprises a delay processing circuit 131 and a driving circuit 132. The delay processing circuit 131 and the driving circuit 132 are electrically coupled together. The major function of the delay processing circuit 131 is to protect a power module 101 in the electrically connected inverter module 100, as shown in FIG. 5. The driving circuit 132 is adapted to convert the output signal of the delay processing circuit 131 into a driving signal, and then to output the driving signal to the power module 101 for driving the power module 101 to work.

Figure 6:
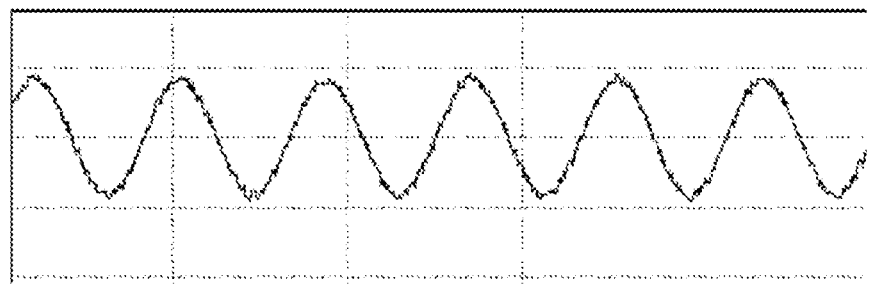
FIG. 6 is a wave curve obtained from the inverter control module in accordance with the present invention.

Referring to FIG. 5, an application example of the inverter control module 1 of the present invention is shown. As illustrated, the inverter control module 1 is electrically coupled to the inverter module 100. The inverter module 100 comprises the aforesaid power module 101, and a wave filter 102. The aforesaid power module 101 and the wave filter 102 are electrically coupled together. Thus, after input of the aforesaid control signal and feedback signal into the error detection unit 11, the error detection unit 11 processes these two signals and then outputs a corresponding error signal to the signal amplifier module 12 for amplification. After amplified the error signal at the predetermined amplification ratio, the signal amplifier module 12 outputs the amplified error signal to the delay processing circuit 131 and the driving circuit 132, enabling the driving circuit 132 to convert the error signal into a driving signal and then to output the driving signal to the power module 101, and thus the power module 101 of the inverter module 100 is driven by the driving signal to start working. FIG. 6 is a wave curve illustrating the waveform of the output signal of the inverter control module 1.

Further, except the hardware and software designs with signal amplification capability, the signal amplifier module 12 can also be designed to raise the frequency of the error signal to a predetermined level and to amplify the signal at a predetermined amplification ratio. Therefore, Therefore, any electronic design such as frequency multiplier or up-converter circuit with frequency-raising function, or any device equipped with a mathematical model, program, process flow and other forms of software components capable of raising the frequency shall be included in the design criteria of the signal amplifier module 12.

Figure 7:
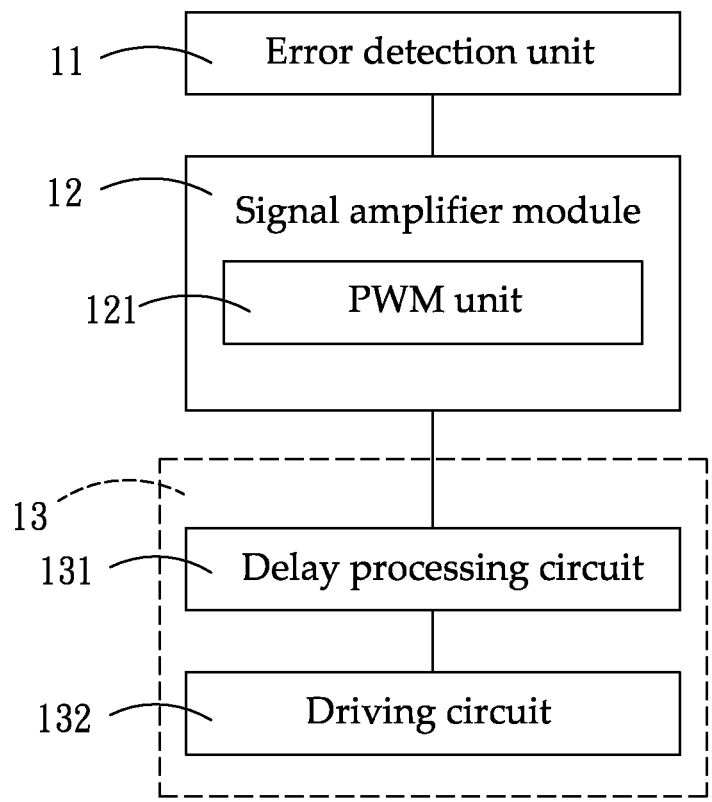
FIG. 7 is a block diagram of an alternate form of the inverter control module in accordance with the present invention.

Referring to FIG. 7, a block diagram of an alternate form of the inverter control module in accordance with the present invention is shown. According to this alternate form, the signal amplifier module 12 further comprises a pulse-width module (PWM) unit 121. The pulse-width module (PWM) unit 121 is capable of suppressing inverter harmonic signal. Therefore, when an error signal is inputted into the signal amplifier module 12, the signal amplifier module 12 amplifies the error signal at a predetermined amplification ratio, or raises the frequency and amplifies the signal, and then outputs the amplified error signal to the delay processing circuit 131 and the driving circuit 132, enabling the driving circuit 132 to convert the output signal of the delay processing circuit 131 into a driving signal and then to output the driving signal to the power module 101. Thus the power module 101 of the inverter module 100 is driven by the driving signal to start working.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An inverter control module electrically coupled to an inverter module for controlling the operation of said inverter module, the inverter control module comprising:
    an error detection unit adapted to receive and process a control signal and a feedback signal from an external source, and then to output a corresponding error signal;
    a signal amplifier module electrically connected to said error detection unit and adapted to receive said error signal from said error detection unit and to raise the frequency of said error signal for output; and
    a driver module electrically connected to said signal amplifier module and adapted to receive a frequency-raised error signal from said signal amplifier module and to generate a corresponding driving signal and then to output said driving signal to a power module of said inverter module for driving said power module to work;
    wherein said driver module comprises a delay processing circuit and a driving circuit, said delay processing circuit and said driving circuit being directly coupled together electrically, said delay processing circuit being directly coupled between said signal amplifier module and said driving circuit, said delay processing circuit being adapted to protect said power module of said inverter module, said driving circuit being adapted to convert said error signal outputted by said delay processing circuit into said driving signal for driving said power module.

2. The inverter control module as claimed in claim 1, wherein said signal amplifier module is selected from the hardware group of amplifier, multiplier, adder and exponential amplifier.

3. The inverter control module as claimed in claim 1, wherein said signal amplifier module is a device selectively equipped with a software of mathematical equation or process flow for signal amplification.

4. The inverter control module as claimed in claim 1, wherein said signal amplifier module is selectively made in the form of a frequency multiplier circuit or up-converter circuit.

5. The inverter control module as claimed in claim 1, wherein said signal amplifier module is device selectively equipped with a mathematical model, program, process flow or software component capable of raising the frequency.

6. The inverter control module as claimed in claim 1, wherein said signal amplifier module comprises a pulse-width modulation unit adapted to suppress an inverter harmonic signal.

* * * * *